(12) United States Patent
Johanson et al.

(10) Patent No.: US 7,430,721 B2
(45) Date of Patent: Sep. 30, 2008

(54) POINTRIGHT: A SYSTEM TO REDIRECT MOUSE AND KEYBOARD CONTROL AMONG MULTIPLE MACHINES

(75) Inventors: Bradley E. Johanson, Palo Alto, CA (US); Terry A. Winograd, Stanford, CA (US); Gregory M. Hutchins, Mountain View, CA (US)

(73) Assignee: Tidebreak, inc., Palo Alto, CA (US)

( * ) Notice: Subject to any disclaimer, the term of this patent is extended or adjusted under 35 U.S.C. 154(b) by 725 days.

(21) Appl. No.: 10/821,685

(22) Filed: Apr. 8, 2004

(65) Prior Publication Data

US 2004/0201628 A1 Oct. 14, 2004

Related U.S. Application Data

(60) Provisional application No. 60/461,555, filed on Apr. 8, 2003.

(51) Int. Cl.
*G06F 3/00* (2006.01)
(52) U.S. Cl. .................. 715/761; 715/751; 715/755; 715/759
(58) Field of Classification Search ................ 715/761, 715/751, 755, 759, 711, 859, 8
See application file for complete search history.

(56) References Cited

U.S. PATENT DOCUMENTS 6,501,441 B1 * 12/2002 Ludtke et al. ................ 345/1.1

OTHER PUBLICATIONS

Brad Johanson et al., "The event heap: a coordination infrastructure for interactive workspaces," Proc. of the 4th Workshop on Mobile Computersystem and Applications (WMCSA-2002), Colicoon, New York, USA, Jun. 2002, pp. 83-93.
Johanson, Brad et al., "The interactive workspaces project: Experiences with ubiquitous computing rooms," IEEE Pervasive Computing Magazine1 (2), Apr.-Jun. 2002.
Johanson, B et al., "Multibrowsing: Moving web content across multiple displays," Preceedings of UBICOMP 2001, Sep. 30-Oct. 2, 2001.
Peter Tandler, "Softwar infrastructure for ubiquitous computing environments: supporting synchronous collaboration with heterogeneous devices," In: Proceedings of UNICOMSQ2001: Ubiquitous Computing Heidelberg: Springer LNCS 2201, 2001, pp. 96-115.
Richardson, Tristan et al., "Virtual network computing," IEEE Internet Computing, vol. 2 No. 1, Jan./Feb. 1998 pp. 33-38.

(Continued)

*Primary Examiner*—Jinhee J Lee
(74) *Attorney, Agent, or Firm*—Lumen Patent Firm, Inc.

(57) ABSTRACT

The present invention provides a software system, PointRight, that allows for smooth and effortless control of pointing and input devices among multiple displays. With PointRight, a single free-floating mouse and keyboard can be used to control multiple screens. When the cursor reaches the edge of a screen it seamlessly moves to the adjacent screen and keyboard control is simultaneously redirected to the appropriate machine. Laptops may also redirect their keyboard and pointing device, and multiple pointers are supported simultaneously. The system automatically reconfigures itself as displays go on, go off, or change the machine they display.

19 Claims, 3 Drawing Sheets

OTHER PUBLICATIONS

Jun Rekimoto et al., "Augmented surfaces: A spatially continuous work space for hybrid computing environments," CHI'99, pp. 378-385.

Andrea Corradini et al., "A map-based system using speech and 3D gestures for pervasive computing." retrieved on Mar. 19, 2004. Retrieved from the internet: < URL: http://search/yahoo.com/search?p=%22easy+living%22+project+mouse&fr=fp-pull-web-t&n=20&fl=0&x=wrt >.

"Synergy." retrieved on Mar. 30, 2004. Retrieved from the internet: < URL: http://synergy2.sourceforge.net/about.html>.

* cited by examiner

POINTRIGHT: A SYSTEM TO REDIRECT MOUSE AND KEYBOARD CONTROL AMONG MULTIPLE MACHINES

CROSS-REFERENCE TO RELATED APPLICATIONS

This application claims priority from a U.S. Provisional Patent Application No. 60/461,555, filed Apr. 8, 2003, and incorporates by reference herein the content and appendices thereof, including computer source code of an embodiment implementing the present invention.

STATEMENT REGARDING FEDERALLY SPONSORED RESEARCH OR DEVELOPMENT

The United States Government has rights in this invention pursuant to Contract No. W-7405-ENG-48 between the United States Department of Energy and the University of California and Subcontract B504665 between the University of California and Stanford University.

FIELD OF THE INVENTION

The present invention relates generally to interactive workspaces and ubiquitous computing. More particularly, it relates to a system, method, and apparatus for smooth and effortless input redirection across screens driven by multiple independent machines and operating systems.

DESCRIPTION OF THE BACKGROUND ART

Ubiquitous computing rooms and interactive workspaces currently being researched and deployed typically have several large screens and dozens of machines which can display to them. Providing convenient and intuitive pointer and keyboard access in such spaces is a challenge because it involves a confusing collection of keyboards and mice or setting up complicated keyboard-view-mouse switch systems.

Some software pointer redirection systems exist. However, they are aimed at allowing one user at a time to control a few dedicated machines with dedicated monitors using a single keyboard and mouse and do not support the complex topologies of interactive workspaces.

A number of researchers have developed systems that allow multiple users simultaneously using a single application. For example, PebblesDraw coordinates the use of pointers by several users within a single application. PebblesDraw is an experimental drawing software designed to explore issues of how multiple users can share the same display with multiple cursors. Users with their personal digital assistant devices (PDAs) connected to a computer can share the same cursor or each has their own separate cursor. An initial idea of PebblesDraw is described in an article by Brad A. Myers, Herb Stiel, and Robert Gargiulo, "Collaboration Using Multiple PDAs Connected to a PC" *Proceedings CSCW'98: ACM Conference on Computer-Supported Cooperative Work*, Nov. 14-18, 1998, Seattle, Wash. pp. 285-294.

On the other hand, remote interaction applications, such as those described in the article "Virtual Network Computing" *IEEE Internet Computing*, Vol. 2 No. 1, January/February 1998, pp. 33-38, by Richardson et al., provide an image of the remote screen, on which a pointer is moved. To control multiple displays, the user must open one VNC window per machine/display and switch among them.

In X-Windows systems, an X-Windows machine can be configured such that mouse and keyboard control are redirected to another X-Windows machine or to a machine running a VNC server. These are specific to X-Windows and do not support arbitrary topologies. Nor do they allow for dynamic changes based on machine state, switching multiple machines to a single screen, or multiple simultaneous redirections. Simply put, these prior systems do not support ubiquitous computing.

The vision of ubiquitous computing, has come to fruition in the growing diversity of widely used computer hardware, including PDAs, large displays, wireless networks, and mobile devices of all kinds. However, most of the software has been borrowed from standard desktop operating systems (OS) and applications. Moreover, in most ubiquitous computing environments exist today, the software is based on a one-to-one linking of a user with an input device, such as a mouse, keyboard, and/or stylus, and a single display.

For many computer applications, the display space or viewing area provided by a single display or screen is not adequate. To solve this problem, Mac OS, Microsoft Windows®, and X-Windows based systems provide an extension that allows a user's pointing device to operate in a geometric space tiled across multiple displays connected to the user's computer (i.e., a multi-head machine). The geometric space is managed by the underlying operating system, residing in the multi-head machine, as a single desktop in which the mouse/keyboard input, i.e., pointer/cursor, follows window activity.

Although this extension is valuable for individual work, it does not generalize to a room size interactive workspace, allowing multiple users to collaborate on multiple independent computers and devices running multiple platforms.

Accordingly, there is a continuing need for a new system, method, and apparatus that enables universal, intuitive, automatic pointer/keyboard/mouse input redirection across screens driven by multiple independent machines and operating systems in an interactive workspace having a flexible topology. The present invention addresses this need.

SUMMARY OF THE INVENTION

It is a primary goal of the present invention to provide a versatile cross-device, cross-platform, multi-user input redirection facility that enables each user to control all of the devices networked in an interactive room or environment.

This goal is achieved in an input redirection system hereinafter referred to as "PointRight." PointRight enables seamless pointer control across adjacent screens located in an enclosure characterized as an interactive workspace. In an embodiment, the interactive workspace is referred to as "iRoom." The iRoom is equipped with a collection of networked machines and display devices running heterogeneous software, including both legacy and custom-built applications.

PointRight can reside in each machine or device that is permanently installed in and/or temporarily brought into the iRoom. Any machine or device configured with the PointRight software can operate as a sender and/or a receiver. Preferably, each machine or device is configured so that each does not operate as both simultaneously, thereby avoiding problems of recursive redirection, loops, etc.

A sender redirects local input events received from one or more local input devices, such as a mouse, keyboard, trackball, touch pad, touch panel, electronic whiteboard, and so on, to a target display (screen) driven by another machine, i.e., a receiver. There can be more than one sender at any time. However, if the receiver's OS only supports one cursor at a time, only one sender can be allowed to interact with the receiver in a meaningful way. The receiver accepts remote pointer and keyboard events into the local event stream. As such, input events from a single sender are re-directed to various screens, despite their video inputs being driven by different independent machines, which may be on different platforms and which may have different input-output (I/O) modalities, such as speech, voice, touch, etc.

PointRight employs a geometric model for pointer motion across screens and redirects input across multiple independent machines and operating systems. The geometric model allows for arbitrary and flexible topologies of rectangular screens, provides intuitive mappings between machines and screens, and enables multiple simultaneously controlled cursors in the iRoom. Since PointRight interacts with a machine's operating system at the level of mouse inputs, all applications running in the iRoom can be controlled via any single input/pointing device, such as a mouse, keyboard, touch pad, track ball, and so on, that is connected to a sender configured with PointRight.

PointRight intelligently tracks operational status and dynamic states of each computer and display device present in the iRoom as well as their logical relationship so that it knows which computer is currently displayed on which screen. PointRight assesses the iRoom's topology map and updates it to account for changes. These background operations are transparent to the user or users of the iRoom.

Accordingly, with PointRight, a user intuitively moves a pointer/cursor seamlessly across the display screens as though they were a single surface. When the pointer/cursor reaches the edge of a screen, it continues its motion onto the connecting edge of the adjacent screen in that direction. If there is no adjacent screen, it simply stops moving and remains at the edge of the screen. The input of any keyboard associated with the pointing device (sender) is directed to whatever machine (receiver) that is currently displaying the pointer/cursor. This functionality allows the user to treat the displayed machines in an interactive workspace as if they were part of one virtual desktop, despite the fact that multiple independent machines are being displayed.

Although PointRight supports multi-head machines, it does not require a dedicated machine or a centralized server, i.e., display devices in the geometric model do not need to be connected to a dedicated multi-head machine or any particular user. As such, PointRight advantageously and significantly opens up the functionality of single-user systems with multiple monitors to the full array of displays, pointing devices, and keyboards associated with all of the computers in an interactive workspace.

PointRight input at its most basic is indistinguishable from native single mouse or pointer input, thereby allowing intuitive control of multiple machines across multiple displays with one keyboard/mouse. PointRight eventually can tag input streams from different users, which are then received by applications that can distinguish them. This would allow PointRight to be used for multiple cursors on a single display.

PointRight is a versatile input redirection tool that supports many different configurations and modes of use and can be applied to any networked collection of machines and input devices. Still further functionalities and advantages of the present invention will become apparent to one of ordinary skill in the art upon reading and understanding the detailed description of the preferred embodiments and the drawings illustrating the preferred embodiments disclosed in herein.

DETAILED DESCRIPTION OF THE INVENTION

PointRight was developed in conjunction with the iRoom—a laboratory for ubiquitous computing research at the Stanford University. Although PointRight will be described in detail below with reference to a specific embodiment implemented for the iRoom, one skilled in the art will appreciate that PointRight is not limited to or restricted by the particulars of the iRoom disclosed herein. In addition, although PointRight is particularly useful in interactive workspaces that include large, shared displays, individual laptops, work stations, wired/wireless handheld devices, etc., it applies to any collection of networked machines with multiple displays and input devices.

Figure 1:
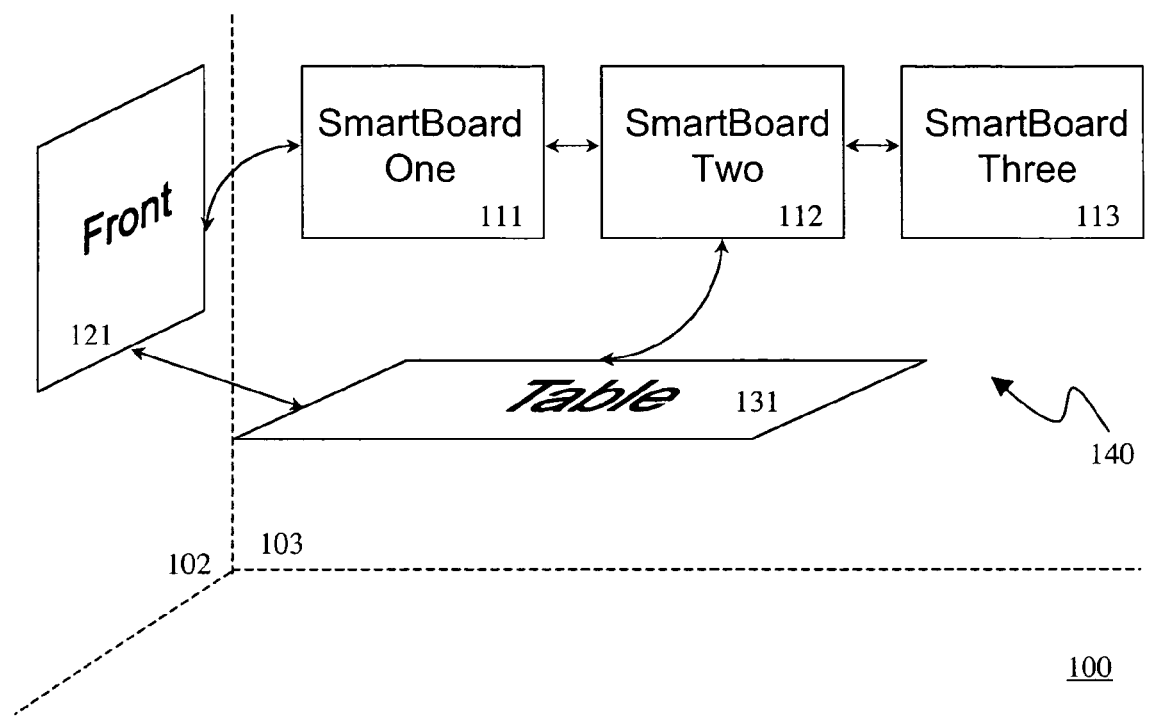
FIG. 1 shows an exemplary input redirection system implementing a space topology description specifying desired pointer transitions among screens.

Development of PointRight began with the simple goal of making it possible for a single mouse and keyboard to provide input to independent desktops on several large displays in a room. FIG. 1 shows a PointRight system implementing an exemplary iRoom screen topology 140 and desired pointer transitions, indicated by the lines and arrows. In this example, the iRoom 100 has three 6' diagonal back-projected touch-sensitive SMART Board™ interactive whiteboards 111, 112, 113 from SMART™ Technologies Inc. of Calgary, Alberta, Canada. These interactive whiteboards 111, 112, 113 are mounted on wall 103 adjacent to wall 102, on which a custom 7' diagonal high-resolution 12-projector tiled back-projected display 121 is mounted. The iRoom 100 also has a bottom-projected 5' diagonal table-top display 131.

Figure 2:
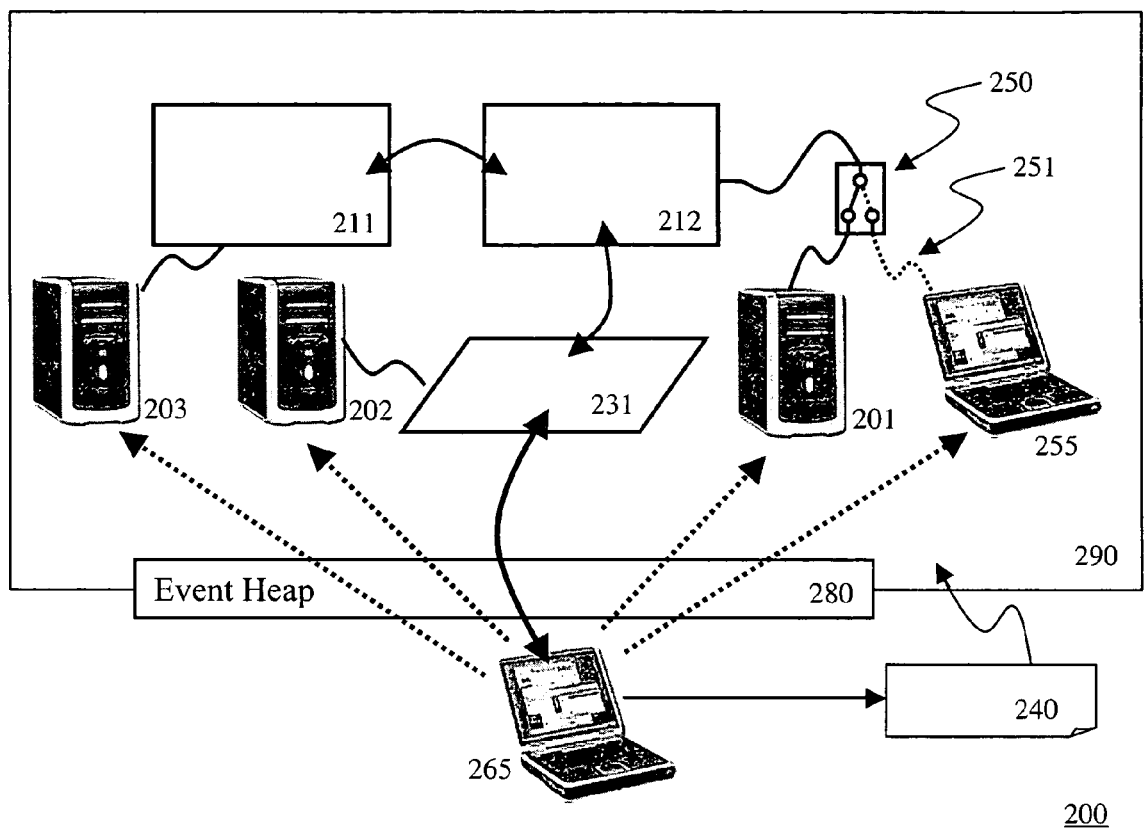
FIG. 2 illustrates a system architecture according to the principles of the present invention.

FIG. 2 shows an exemplary system architecture of PointRight. Since PointRight allows for flexible, arbitrary topology of a workspace, one skilled in the art will appreciate that other implementations and configurations are possible and are not limited by what is shown and described herein. In this example, each display device, e.g., 212, has at least two inputs: one fed by a "home" machine, e.g., 201, that is a permanent part of the iRoom infrastructure 200, and one connected via a VGA splitter 250 to a cable 251 that can be plugged into a laptop or an external, "visiting" machine 255.

The iRoom 200 implements a wireless local area network (LAN) 290 that supports visiting machines such as laptops and PDAs arbitrarily brought into the room. While it is possible to walk from display to display to directly interact with each screen, this is often inconvenient. Especially in a multi-user, team-based collaboration and problem solving environment, users need to be able to interact with all of the visible displays (screens) from anywhere in the iRoom without walking around.

When we first began using the iRoom, it became clear that supporting this modality would be challenging. If there were wired keyboards and mice for each display, it would be very difficult to figure out which keyboard/mouse to use, or even which keyboard goes with which mouse. While a keyboard-video-mouse switch was an option, users would have had to keep track of to which machine control was currently being routed, and memorize keyboard hot-key combinations to switch to new machines. Moreover, in the iRoom, multiple display surfaces or viewing areas are not all controlled by a single machine and hence there is not a single master input device that operates across them.

As one skilled in the art will appreciate, it is impossible to fully operate a standard OS without a convenient mouse and keyboard. In the example of the iRoom, while SMART™ Technologies provides a software keyboard to supplement the touch panels, it is only useful for trivial amounts of typing and requires users to walk to the board. When the iRoom was first set up, there was a wireless mouse and keyboard per projection display. As one would expect, this was both confusing and caused clutter. Thus, the first goal of PointRight was to reduce this to a single mouse and keyboard for the multiple displays driven by the multiple machines in the iRoom.

The second goal of PointRight was to control any device projected on a touch screen. The touch panels for the SMART™ interactive whiteboards are connected as input devices to their associated permanent iRoom machines. Projecting a laptop or other computer on the SMART board strongly suggests that the touch panel should work for that machine, not the one that is physically connected to the touch panel. Rewiring and then installing the SMART drivers on a projected laptop is clearly an unsatisfactory solution. PointRight solves this problem by redirecting local input events from the active machine (sometimes referred to as a "hidden machine") that is physically connected to the touch panel (sender) to the laptop (receiver) that is displaying on the screen with the touch panel (target display device).

The third goal of PointRight was to enable an arbitrary member of a team to use his personal mouse and keyboard (usually connected to a laptop) on a public screen. Having a single iRoom mouse and keyboard is great for a single user, but for multiple users, it is much more convenient to be able to use any mouse and keyboard at hand. The iRoom software is based on a middleware layer called iROS, which enables the communication of events and information across all of machines in the iRoom. An iROS facility, Multibrowse, makes it easy for a team member or a participant in a meeting to bring up any web page or application on any of the shared screens in the iRoom. Through a simple drag and drop action, a file or URL from the local machine appears on the shared display. Often the next step is to take further actions such as following links on the displayed page. Being able to redirect the participant's input from his input devices to the public screen is much more intuitive and significantly more convenient for the participant, especially in cases of laptop computers, than switching to the iRoom mouse and keyboard at that point.

These goals led to the following PointRight system design criteria.

Multi-Input, Multi-Display

PointRight allows multiple users to use multiple mice and keyboards to interact with multiple displays and machines. PointRight input masquerades as hardware input on any particular machine, which provides the maximum generality with respect to applications, albeit with the side effect that only as many cursors can be simultaneously active on one machine as are supported by the OS on that machine. Extensions for special applications are possible, as discussed above. As in all pointer redirection systems, keystrokes follow the pointer.

Flexible and Dynamic Topology

Interactive workspaces have a variety of topologies. Not only can screens tile a plane in arbitrary ways, but there may be folds and corners. The system needs to support arbitrary topological spaces composed of rectangular screens of different sizes and aspect ratios, and to provide smooth pointer/cursor motion across all of them. For example, in the iRoom setup shown in FIG. 1, the left edge of the table display 131 connects to the bottom edge of our front display 121 while the top edge connects to the bottom of the middle whiteboard 112. Other mappings are possible, e.g., each of the three whiteboards 111, 112, 113 is connected to the corresponding third of the adjacent edge of the table screen 131.

The topology can also be dynamic. There can be permanent displays, some of which may switch between displaying several different machines. Some machines may be able to control several different screens simultaneously. Some screens may be on rollers, and laptops may enter and exit the workspace. For example, in FIG. 2, laptop 265 is temporarily connected to the iRoom topology via the table display 231, which is connected to a permanent home machine 202. Therefore, PointRight must maintain a dynamic map of the room topology and the mapping between machines and screens.

Different Input Types

PointRight supports at least the following mapping scenarios.

Screen-bound: (e.g., SMART™ Boards, tablet computers, eBeam pens). When the pointing device operates directly on the display surface, there is a natural, fixed mapping from the pointing position to a corresponding pixel on the screen. PointRight preserves this natural mapping by forwarding the pointing position to the machine currently displaying to the screen. For example, a touch panel only operates on a machine whose display image is visible on the touch surface, either via projection or via a system that mirrors the display pixels.

Machine-bound: (e.g., generic laptop and desktop). Most conventional pointing devices, such as mice or trackpads, input relative motion rather than absolute position. This motion is not intrinsically tied to a particular display position. However, the input is conceptually tied to a specific machine by the juxtaposition of the input device with the display. This association is particularly strong for laptops, where the display, keyboard and pointing device share a common package.

The display associated with a machine-bound device is normally private, rather than part of the iRoom topology. The user makes an explicit choice to switch between private vs. room use via, for example, a hot-key command. Alternatively, the user could slide the cursor off the top edge of the display to enter the iRoom as a universal pointer. Because of the strong expectation that machine bound devices operate with its associated display, when redirecting input in this scenario PointRight provides a strong visual reminder (such as a grayed-out screen or a big message box) that input is being remapped/redirected to the iRoom.

Free-space:.(e.g., iRoom mouse and wireless keyboard). Any relative input/pointer device that is not obviously associated with a specific display device or machine can be freely mapped to a workspace. Such a input/pointer device may be a free-floating wireless keyboard/mouse available for use in the workspace. This works particularly well if the actual machine receiving the input is not visible, such as a wireless mouse and keyboard mapped through a machine hidden in the iRoom infrastructure. A free-space device needs an explicit starting screen, which must be active and visible to avoid confusion.

Working Example of an Implementation

As describe above, the iRoom software runs on an interactive meta-operating system called iROS. The iROS has a tuplespace-based coordination subsystem called Event Heap.

As shown in FIG. 2, Event Heap 280 provides a blackboard-like communication mechanism for the iRoom 200, enabling the communication of events and information across all of the machines in the interactive workspace. For more detailed teachings on the iRoom, iROS, Event Heap, and other relevant components of the iROS, including the aforementioned Multibrowse, readers are directed to the following publications: Brad Johanson, Armando Fox, and Terry Winograd, "The Interactive Workspaces Project: Experiences with Ubiquitous Computing Rooms," *IEEE Pervasive Computing Magazine* 1(2), April-June 2002; Johanson, B. and Fox, A., "The Event Heap: A Coordination Infrastructure for Interactive Workspaces," *Proc. of the 4th IEEE Workshop on Mobile Computer Systems and Applications* (WMCSA-2002), Callicoon, N.Y., USA, June 2002; and Johanson, B., Ponnekanti, S., Sengupta, C., Fox, A., "Multibrowsing: Moving Web Content Across Multiple Displays," *Proceedings of Ubicomp 2001*, Sep. 30-Oct. 2, 2001.

PointRight runs on the iROS and uses the Event Heap for communication, along with direct socket connections as needed for performance. To participate in PointRight, a machine runs a PointRight application and is connected through the local area network 290 to the iROS. In an embodiment, each machine running the PointRight software stores a space topology description of the interactive workspace 200, i.e., the iRoom topology map 240. This iRoom topology map 240 describes the workspace 200 and specifies how pointer/keyboard control should be re-routed/redirected among screens (display devices) 211, 212, 213 and machines 201, 202, 203, 255, 265 in the workspace 200. Objects/attributes for the iRoom topology map are described in Table 1 below.

TABLE 1

| | |
|---|---|
| Screens | Screens contain the dimensions of the physical screen (in inches), a set of connections to other screens, and a set of machines that can display video to this screen. They also store the state of whether the screen is on or off, and which machine is currently driving the screen, i.e., providing the video for the screen. |
| Machines | Machines are computers or computing devices running the PointRight application and can therefore receive pointer events (they can also send events, but this information does not need to be shared globally). Each machine object stores the rectangular pixel region for which the PointRight application on that machine is responsible. Thus, a multi-head physical machine has multiple machine objects. There can also be generic machines, which are dynamically linked to specific machines. For example, a machine object called "laptop-drop" represents a laptop connected to the iRoom VGA input cable for laptop projection. This option obviates the need to edit the space topology description for each different laptop. |
| Connections | A connection represents a valid transition between screens that pointers can traverse. They are represented by an edge (top, bottom, left, right) for each of the connected screens, and the region of the edge on each screen through which the pointer can transition. The region is defined by offsets that define the active region on the edge. For example, 0'-4' on the top of the table display 131, 231 connects to 0'-5' on the bottom of the whiteboard 112, 212, as shown in FIGS. 1 and 2, respectively. A left edge could be connected to a top or bottom, and screens flipped relative to each other are also handled by reversing the order of the offsets relative to one another (as in the case with the connection between the table display 131 and the front display 121, as shown in FIG. 1). There can be multiple connections to a single screen edge as long as the edge regions for the connections do not overlap. |

In an exemplary embodiment, the topology map is loaded from a configuration file when the application starts. In this embodiment, although the basic topology is static, PointRight intelligently tracks and maintains the dynamic state of whether and which screens and machines are on/off, as well as which machine is connected to which screen. One advantage of the "one topology map per a machine" implementation is that it allows each source of pointer control to have a different topology of the iRoom, allowing iRoom users to use unique subsets of the visible screens.

The PointRight application comprises a sender and a receiver. A machine acting as a sender, e.g., 265, redirects mouse and keyboard events from the local input device or devices while the receiver, e.g., 201, accepts remote pointer and keyboard events into the local event stream. Senders use the space topology description for the workspace to direct input to the appropriate machine that is driving the target display. Receivers are responsible for receiving events and rescaling cursor motions to fit their particular display. Any machine running the PointRight software can operate as a sender and/or a receiver. However, if the underlying OS does not allow more than one active pointer/cursor at a time, a machine/device would preferably act as either one, but not both simultaneously, thereby avoiding problems of recursive redirection, loops, etc. This problem can be solved by a switching mechanism that decouples local mouse hardware level mouse and keyboard input from the input queue of the GUI. This allows the hardware level input of a machine to be redirected while at the same time software control is routed from a remote sender into the input queue of the machines GUI. The interaction between a sender and a receiver is conceptually peer-to-peer—PointRight utilizes the Event Heap, a tuplespace-like, server based application coordination infrastructure, but there is no centralized PointRight server.

When a sender is started, it accesses the current space topology description to determine the configuration and status of the available machines. In an embodiment, the space topology description is a shared, manually edited configuration file that specifies the basic topology of screens, machines, and connections in a text-based attribute-value format. Dynamic state information is maintained about screen state (on/off), machine state (on/off), and which machine is displaying to which display through broadcasts over the shared Event Heap network. PointRight eventually will enable dynamic changes to other configuration aspects as well.

PointRight can easily be installed as a sender on a personal laptop. When a machine starts up it simply needs to run the application to become a sender. This makes it realistic to use individual laptops for PointRight input, even when they are not dedicated for use in the workspace. This use has turned out to be one of the most effective uses of PointRight.

By monitoring events on the Event Heap, each sender maintains dynamic data on the state of machines and displays. Events are generated when a screen is switched on or off, a new machine becomes connected to a screen, or when the PointRight application is opened/started or closed/ended on a machine. Events are posted and retrieved on the Event Heap server machine, and persist for a little more than two minutes. All active machines post events refreshing their current state every two minutes. If the senders do not see an event from a previously active machine or screen, the state of that object in the local database is updated to "off." This soft-state mechanism allows for the graceful handling of crashes, and also provides a simple mechanism for new senders that come up to acquire the current state of machines and screens in the interactive workspace. The soft state mechanism makes it possible for machines to react to system changes without interruption.

In particular, if some machine goes down, the system adapts to the change within a couple of minutes without the need for explicit intervention.

The sender has two basic modes, one for screen-bound input, and one for normal (machine-bound or free-space) input. For screen-bound devices, once an event is posted that a new machine is being displayed on the screen, the sender begins forwarding the absolute position of the pointing input to the machine currently displaying to it. With relative input, the sender determines a virtual location for the pointer based on its own screen coordinates (extending beyond its visible screen) and uses the geometrical information to convert the absolute position into an appropriate target screen (based on the current state of connections of machines to screens) and a normalized position on that screen. If a machine is not currently running a PointRight receiver, or a display is off, then the sender skips over that display to the next one in the same direction. If no receiver is available in an indicated direction, then the cursor remains at the edge of the screen, just as it does on reaching the edge of the screen in a standard one-display system. Once a target screen is determined, a command to position the cursor on the machine displaying to that screen is sent.

The receiver is configured with the area of the screen for which it is responsible. The sender passes an absolute value in a normalized range for x and y. These normalized values are scaled to the x and y range managed by the receiver, and the pointer on the receiver machine is set to this position. Keyboard events from the sender are inserted into the event queue on the receiving machine. Events coming from multiple senders are put into the queue in whatever order they arrive. Currently they are not tagged with information as to the sender, but that is a planned extension.

PointRight senders and receivers communicate over an IP (Internet Protocol) network with access to a shared Event Heap server. To avoid too much latency in tracking cursor motion at adequate rates, in an embodiment, a simple socket-based protocol was implemented to send these events directly from the sender to the current receiver, i.e., establishing a peer-to-peer communication between the sender and the receiver. The Event Heap is used to communicate the changes of pointer location to a new screen/machine that lead to opening and closing these sockets. Sockets are only opened if there is no existing connection to the new target machine. Keystrokes are communicated using the socket as well. As one skilled in the art will appreciate, advances in related fields may obviate the need for these direct socket connections. In fact, working implementations with the Mac OS X demonstrate that PointRight can easily support a half dozen users on a wireless network and even more on a wired network utilizing the latest release of the Event Heap. In most actual cases, unsatisfactory delay is caused by contention between PointRight events and other network traffic and not by the Event Heap itself.

Application suites used in the iRoom, such as those for construction management, make use of a collection of independent, heterogeneous applications running on both shared and individual computers in the iRoom. Some of these applications are generic, i.e., off-the-shelf, some are customized, and some require legacy support. Moreover, while the home machines by default run Microsoft Windows® operating systems, visiting machines regularly run any of Windows®, Mac or Linux operating systems. Accordingly, PointRight, by design, is platform-independent. The PointRight system currently runs on Windows® 9x/NT/2000 and on Mac OS X, and implementation for Linux is underway. An embodiment of the PointRight source code was published on Apr. 8, 2002 and attached to the above-referenced provisional patent application filed on Apr. 8, 2003.

One of the advantages of PointRight is its generality/versatility, which enables it to be used in a variety of hardware and user configurations. Summarized below are several working scenarios.

The Original iRoom

PointRight was initially developed in the original iRoom 100, as described above with reference to FIG. 1. The iRoom is primarily for ubiquitous computing research and small meetings and presentations. An embodiment of the PointRight system has been in daily use in the iRoom and has been relatively robust. On the rare occasions when it fails, restarting takes only a minute or two.

The original iRoom includes a machine with multi-display output that can be used to display a single Windows desktop combining the three adjacent SMART™ Boards. Although it can be controlled through PointRight using a free-space or machine-bound mouse, the natural interaction is to use the touch screens, each of which now has a display that maps to one third of the desktop on the single machine. Although this is a somewhat specialized situation, the fact that the generalized PointRight mechanism can be used for it is indicative of the flexibility of the approach.

Alternate iRooms

Figure 3:
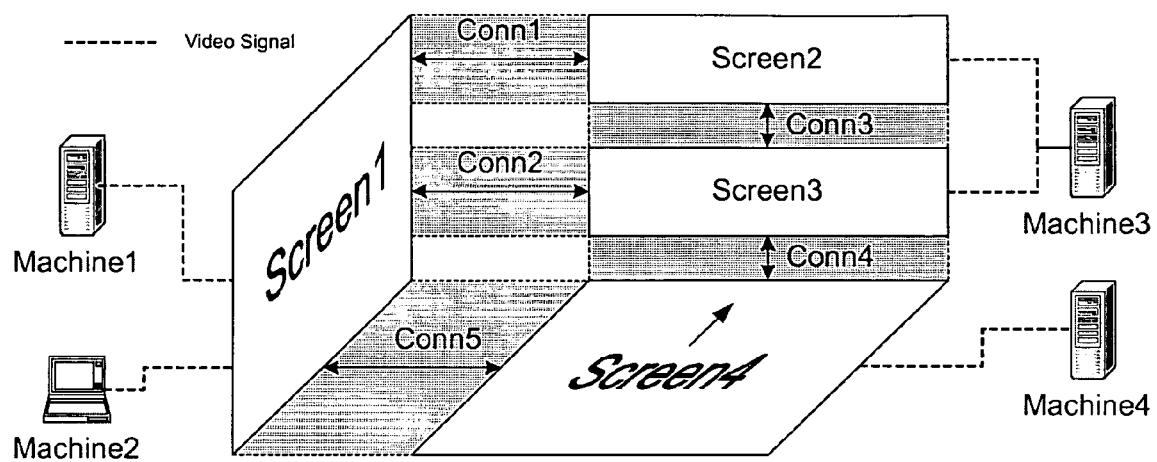
FIG. 3 shows an exemplary input redirection system implementing another space topology description specifying machines, screens, and desired pointer transitions between the machines and the screens.

Alternate iRooms have been developed for other uses, such as construction management and project-based education. Each alternate iRoom is tailored for a particular use, with different configurations of devices. FIG. 3 shows a topology map of a first alternate iRoom 300 having 4 large displays (screens 1-4) and 4 permanent home machines (machines 1-4). Machine 3 is a multi-head machine driving screens 2, 3, feeding video signals thereto, as indicated by the dashed lines. Screen 1, on the other hand, is driven by machines 1 or 2.

A second alternative iRoom has three front-projected touch panels. Users have the choice of using the touch screen directly, thereby shadowing the screen, or using PointRight with a free-space device, so they don't have to stand in front of the screen.

Another alternative iRoom has two front projection displays and no touch panels. Here, the primary input mode is done by PointRight on the wireless mouse and keyboard.

In addition to providing smooth and effortless input redirection for high capacity facilities such as the iRoom, PointRight is equally useful and valuable in "low tech" environments with minimal standard equipment. The smallest configuration is a pair of computers (laptops or desktops), one of which runs the Event Heap server (which supports a variety of iROS capacities in addition to PointRight) and one or both of which run PointRight, as sender or receiver. This is particular useful in a software development environment, where a developer can use a single mouse and keyboard to interact with several machines without using a monitor switcher.

Another alternative iRoom has one large front projection display and five large plasma panel display devices, each displaying a plurality of laptop computers running PointRight. This alternative iRoom is designed for group critiquing of student writing. The laptops are for individual students and the large plasma panel displays are for shared use by the groups of, e.g., three laptops. The single projected display is at the front of the room. The PointRight configuration is set up so that students within a group can simply move the cursor off the top of their laptop screens onto the bottom of the shared screen, which displays a document being jointly discussed. Moving off the top of the group screen, the cursor goes onto the projected room screen.

In this alternative iRoom, ordinary word processing software is used on the shared screens, with no special treatment for multiple pointers. Since the students are engaged in face-to-face discussion, ordinary social protocols are quite appropriate and have proved adequate to avoid problems of concurrent action. This negotiation is invisible in the same sense that the movement of pointer from screen to screen is invisible. It does not interpose any explicit mechanisms, but simply meets natural expectations.

To create a mode where each student's cursor moves directly from the laptop to the room screen instead of to a group plasma panel, the plasma panels can be turned off and the dynamic mapping automatically routes across them to the next available target, which is the room screen. With a dynamic topology database, it will also be possible to accomplish this by changing the connections between screens.

As describe above, currently, data about the interactive space is partitioned into two components: static and dynamic. Information about the size and location of displays, projectors, machines, etc., is stored in a file that is accessed by the senders when they start up. Information about the current state of each of these (whether projectors are on or off, what machine currently is feeding the VGA cable, etc.) is maintained dynamically through the soft state mechanism of the Event Heap. It is anticipated that PointRight can be implemented to interactively update the static information without having to edit a configuration file. Some of this can be done automatically (e.g., detecting new machines that are running a PointRight receiver). In addition, PointRight may be implemented in a context-aware environment in which sensors report the location, identity, and orientation of each device, possibly extending the vision-based techniques used to locate laptops on the known InfoTable and/or to track people in Easy Living, a known Microsoft® project.

It is also anticipated that PointRight can be implemented to support flexible, concurrent input by multiple PointRight senders. PointRight currently enables multiple users to point at the same screen, although only one can do meaningful work at any given time. Having multiple users active on the same screen requires multiple cursors (or the equivalent), plus OS and application support for multiple inputs.

Moreover, it is possible to implement the PointRight system disclosed herein in a true peer-to-peer manner without a central event handler at all. The programming techniques necessary to achieve this are with the general knowledge of one skilled in the art.

In sum, unlike other input redirection systems, PointRight allows for heterogeneous operating systems and applications, combinations of fixed and mobile devices, flexible layout topologies, and multiple users simultaneously redirecting the control of different mice and keyboards. It supports dynamic environments, multiple machines per screen, and multiple screens per machine, and allows for direct interaction input devices such as touch screens. The PointRight system, as implemented, requires only that an Event Heap, or an equivalent event handler, be running in the interactive workspace, and that each machine that is going to participate, either as a source or target of pointer events, is configured with the small PointRight client application. PointRight is intuitive and convenient. Users do not need special training or explanation, beyond a simple introduction.

As one skilled in the art will appreciate, most digital computer systems can be installed with PointRight. To the extent that a particular computer system configuration is programmed to implement PointRight, it becomes a digital computer system within the scope and spirit of the present invention. That is, once a digital computer system is programmed to perform particular functions pursuant to computer-executable instructions from program software that implements the PointRight system, it in effect becomes a special purpose computer particular to the present invention. The necessary programming-related techniques are well known to those skilled in the art and thus are not further described herein for the sake of brevity.

Computer programs implementing the PointRight system can be distributed to users on a computer-readable medium such as floppy disk, memory module, or CD-ROM and are often copied onto a hard disk or other storage medium. When such a program of instructions is to be executed, it is usually loaded either from the distribution medium, the hard disk, or other storage medium into the random access memory of the computer, thereby configuring the computer to act in accordance with the inventive method disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the invention disclosed herein.

Although the present invention and its advantages have been described in detail, it should be understood that the present invention is not limited to or defined by what is shown or described herein. As one of ordinary skill in the art will appreciate, various changes, substitutions, and alterations could be made or otherwise implemented without departing from the principles of the present invention.

We claim:

1. An interactive workspace for one or more users, comprising:
   (a) a plurality of independent machines, wherein none of said independent machines is a dedicated server machine, wherein each of said independent machines can be in send mode or in receive mode, wherein a plurality of said independent machines are in send mode, called senders and wherein a plurality of said independent machines are in receive mode, called receivers;
   (b) a plurality of input devices operatively coupled to said senders and said receivers;
   (c) a plurality of display means driven by said senders and said receivers;
   (d) a network connecting said display means, said senders, and said receivers;
   (e) a topology map for each of said senders, wherein said topology map comprises a set of valid pointer transitions between said plurality of display means driven by said receivers;
   (f) a computer program, wherein said computer program comprises for each of said senders:
      (i) pointer control over one of said receivers, referred to as a corresponding receiver, wherein a pointer controlled by the same of said senders is displayed in one of said display means driven by said corresponding receiver, and one or more of said input devices of the same of said senders are usable on said corresponding receiver; and
      (ii) motion control for a redirection of the pointer controlled by said same of said senders between one of said display means of said corresponding receiver to one of said display means of another of said receivers, said redirection being related through said valid pointer transitions of said topology map of the same of said senders;

(g) a means for each of said independent machines in send mode to switch to receive mode; and (h) a means for each of said independent machines in receive mode to switch to send mode.

2. The interactive workspace as set forth in claim 1, further comprising:
a button or key to begin said redirection of the pointer between one of said display means of said corresponding receiver to one of said display means of another of said receivers.

3. The interactive workspace as set forth in claim 1, further comprising:
a means for initiating said redirection of the pointer between one of said display means of said corresponding receiver to one of said display means of another of said receivers, wherein said initiating means comprises movement of the pointer to the edge of one of said display means of said corresponding receiver.

4. The interactive workspace as set forth in claim 1, wherein at least one of said senders is characterized as in a screen-bound mode and is connected to a screen-bound absolute positioning device.

5. The interactive workspace as set forth in claim 1, further comprising means for scaling relative motion of the pointer directed by each of said senders and displaying the scaled motion onto one of said display means of said corresponding receiver.

6. The interactive workspace as set forth in claim 1, further comprising
means for displaying the pointer at a normalized position on one of said display means of said corresponding receiver based on a predetermined coordinate system, the current coordinates of the pointer, and relative motion of the pointer directed by each of said senders.

7. The interactive workspace as set forth in claim 1, wherein said topology map further comprises physical dimensions and aspect ratios of said display means.

8. The interactive workspace as set forth in claim 1, further comprising:
means for tracking and maintaining dynamic state information about said independent machines in send and receive modes, said display means, and which of said display means is driven by which of said independent machines.

9. The interactive workspace as set forth in claim 1, further comprising:
means for maintaining said topology map by updated mappings between said independent machines in send and receive modes and said display means.

10. The interactive workspace as set forth in claim 1, wherein said independent machines in send and receive modes run one or more operating systems.

11. The interactive workspace as set forth in claim 1, wherein one of said independent machines is characterized as a multi-head machine having two or more output ports connected to at least two of said display means.

12. The interactive workspace as set forth in claim 1, wherein one of said display means is connected to at least two of said independent machines, driven by one of said connected independent machines at any given time.

13. The interactive workspace as set forth in claim 1, wherein said topology map of relations between said display means comprises corners and folds.

14. The interactive workspace as set forth in claim 1, wherein the number of said senders is greater than or equal to the number of said corresponding receivers under pointer control of said senders.

15. The interactive workspace as set forth in claim 1, wherein the pointers of a plurality of said senders is displayed on one of said display means and said pointer control is reduced to one of said senders.

16. The interactive workspace as set forth in claim 1, wherein said independent machines in send and receive modes comprises personal computers, laptop computers, phones, personal digital assistants, tablet computers, interactive tables, other processing machines, and any combination thereof.

17. The interactive workspace as set forth in claim 1, further comprising means for identifying the location of the pointer on request.

18. The interactive workspace as set forth in claim 1, wherein at least one of said input devices of one of said senders is a keyboard, and wherein said keyboard is usable on said corresponding receiver of the same of said sender.

19. The interactive workspace as set forth in claim 1, wherein multiple of said senders can have pointer control over one of said display means driven by one of said receivers.

* * * * *